United States Patent [19]

Pundt

[11] 4,304,404

[45] Dec. 8, 1981

[54] METHOD AND MEANS OF SEQUENTIALLY OBSERVING PLAYER POSITIONS IN PREDETERMINED GAME PLAYS

[76] Inventor: Richard A. Pundt, 4118 Hickory Hill La. SE., Cedar Rapids, Iowa 52403

[21] Appl. No.: 87,217

[22] Filed: Oct. 22, 1979

[51] Int. Cl.³ .............................................. A63F 9/00
[52] U.S. Cl. .................................. 273/85 G; 273/88; 273/94; 434/251; 434/248
[58] Field of Search ............... 273/94, 85 G; 35/29 R; 434/251, 248, 247

[56] References Cited

U.S. PATENT DOCUMENTS

| | | | |
|---|---|---|---|
| 2,149,325 | 3/1959 | White | 35/29 R |
| 3,563,547 | 2/1971 | Marsh | 273/94 R |
| 3,973,773 | 8/1976 | Glass et al. | 273/94 R |
| 4,093,223 | 6/1978 | Wilke et al. | 273/94 R |
| 4,117,606 | 10/1978 | Pundt | 273/94 R X |

Primary Examiner—Paul E. Shapiro
Attorney, Agent, or Firm—Zarley, McKee, Thomte, Voorhees & Sease

[57] ABSTRACT

An apparatus for sequentially observing player positions in predetermined game plays includes a player position matrix in the form of a playing field including a plurality of L.E.D. indicators for designating various player and ball positions. A memory includes a plurality of play sequences each comprising a plurality of player positions. A keyboard control enables selection of one of the play sequences so that the changing positions of the players and ball will be visibly and sequentially imposed on the matrix through the memory to visibly display the progressive development of a play to its conclusion. The method comprises actuating the keyboard control to select one of the play sequences and to visibly and sequentially display the changing positions of the players and ball on the playing field matrix.

10 Claims, 12 Drawing Figures

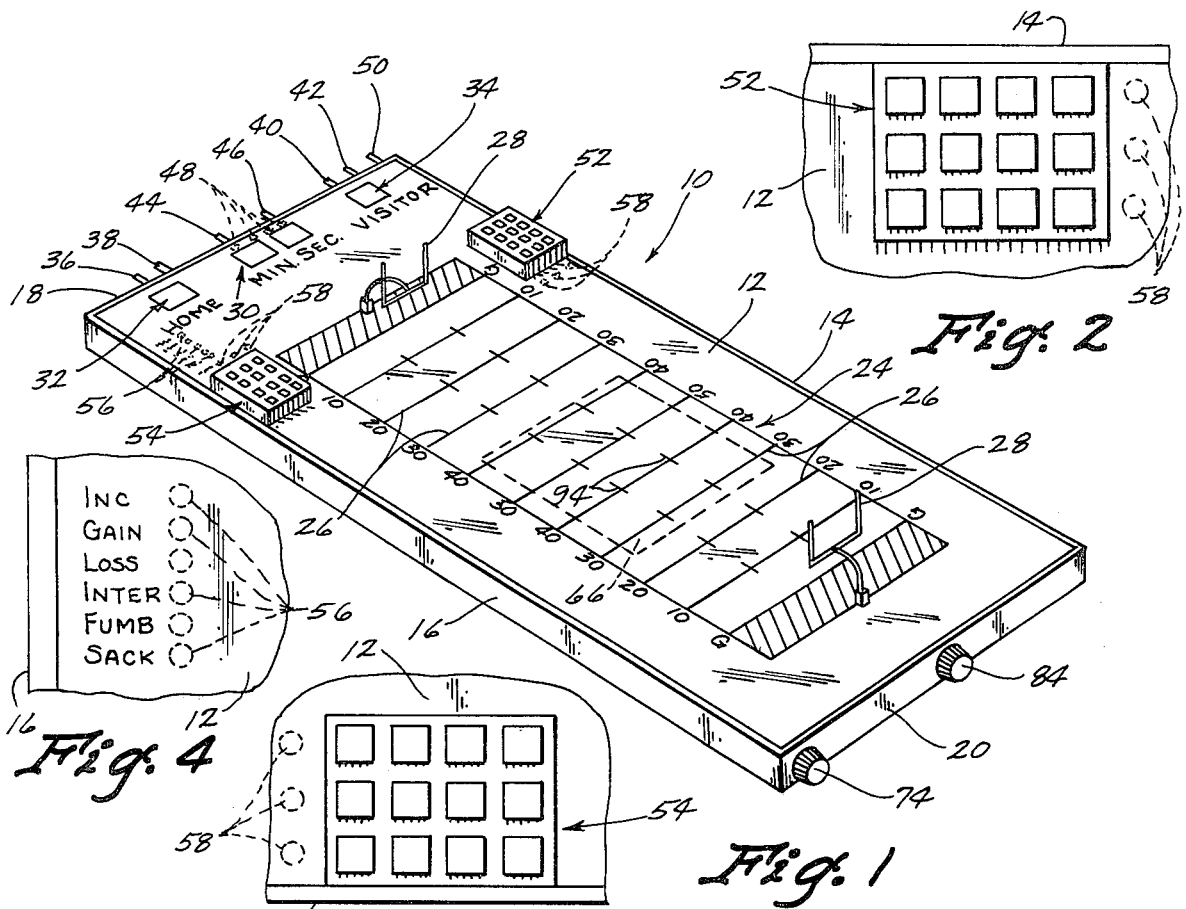
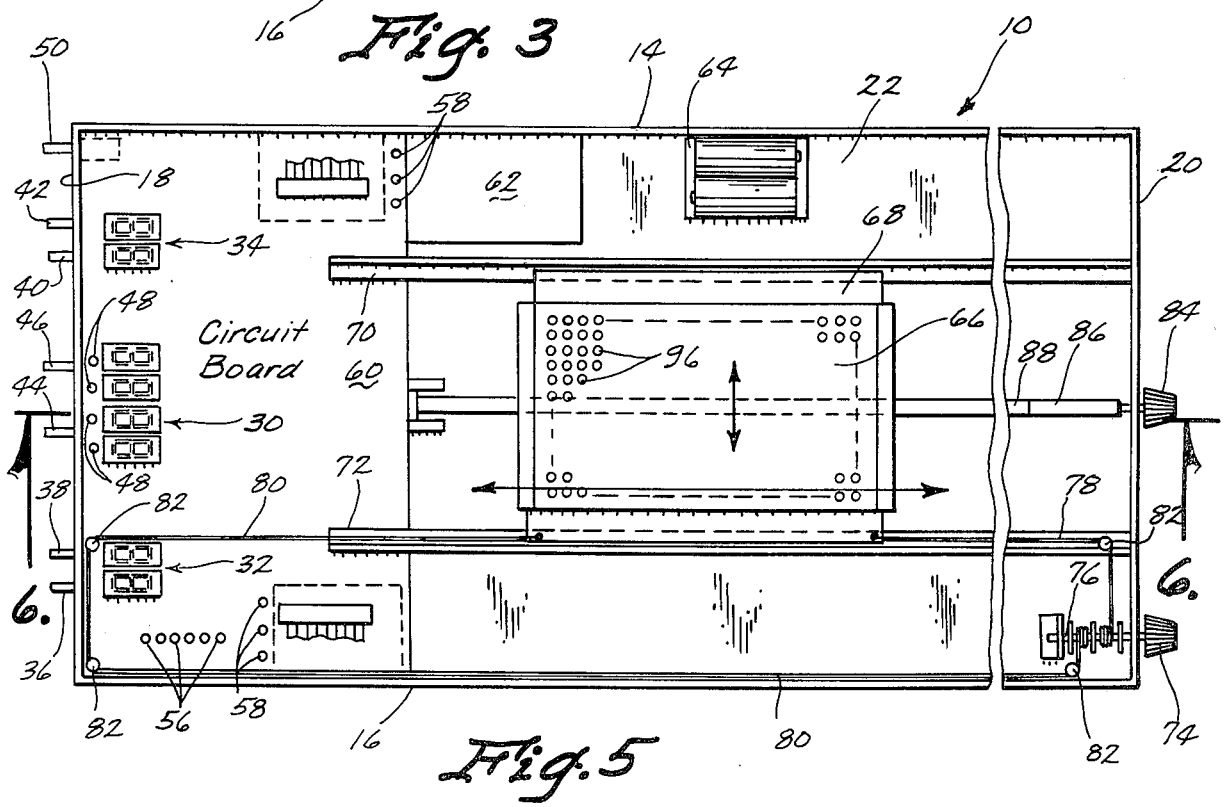

METHOD AND MEANS OF SEQUENTIALLY OBSERVING PLAYER POSITIONS IN PREDETERMINED GAME PLAYS

BACKGROUND OF THE INVENTION

The present invention relates generally to game board type simulations of athletic games and more particularly to a method and means for sequentially observing the changing player and ball positions in predetermined game plays.

A need exists for permitting the sequential analysis of player positions as play in a given game evolves. This is particularly true for football as various offensive and defensive formations are used. The need for such a system is important for coaching, teaching, research and even recreation. The inventor's own prior U.S. Pat. No. 4,117,606 disclosed a method and means for showing game plays materialize sequentially by intermittently changing the positions of overlying pre-selected offensive and defensive play sheets and a master sheet. The present invention represents an improvement over that device. Whereas the device of applicant's prior patent was a significant advance in the art, it did involve the storage and manipulation of a plurality of play sheets such that the operators were at least partially occupied with mechanically operating the game board apparatus so that somewhat less than their full attention could be devoted to the observation of developing plays and strategy for selecting upcoming plays.

SUMMARY OF THE INVENTION

An apparatus for sequentially observing player positions in predetermined game plays, according to the present invention, includes a player position matrix including a plurality of indicia means designating various player positions which are adapted to be sequentially operated to designate the changing positions of a plurality of players during a given play. A memory unit is operatively connected to the matrix and includes a plurality of play sequences, each comprising a plurality of player positions. A control unit, which may be in the form of a keyboard, is operatively associated with the memory unit to permit selection of one of the plurality of play sequences so that the changing positions of the players and ball will be visually and sequentially imposed on the matrix through the memory unit.

Separate offensive and defensive keyboards may be provided to allow the offense and defense to be assembled according to actual game conditions. The various play sequences which may be pre-selected for various players or groups of players accommodate different results on a given play.

In addition to the recreational value of the present invention, specific game situations can be programmed by the selection of various offensive and defensive position assignments and play sequences so that teaching, coaching and research can be conducted as each play is sequentially evolved and observed. Once the keyboard selections for a given play are entered, the play proceeds automatically without operator's assistance so that the operator's full attention may be concentrated on observing the developing play and strategy for future plays. To further simulate actual playing conditions, the player position matrix may simulate a playing field and a clock and scoreboard may be automatically operated by the device as a game proceeds. The method of the invention includes providing a game as described above and actuating the control unit, thereby selecting one of the plurality of play sequences and visibly and sequentially imposing the changing positions of the players on the matrix through the memory unit.

BRIEF DESCRIPTION OF THE DRAWINGS

FIG. 1 is a perspective view of an embodiment of the invention which is adapted to simulate a football game;

FIG. 2 is a partial enlarged top view of the offensive keyboard of the apparatus;

FIG. 3 is a similar partial enlarged top view of the defensive keyboard of the apparatus;

FIG. 4 is a similar partial enlarged top view of the play outcome indicator of the apparatus;

FIG. 5 is a partially fragmented top view of the apparatus with the cover plate moved to expose the operating elements thereof;

DESCRIPTION OF THE PREFERRED EMBODIMENT

Figure 6:
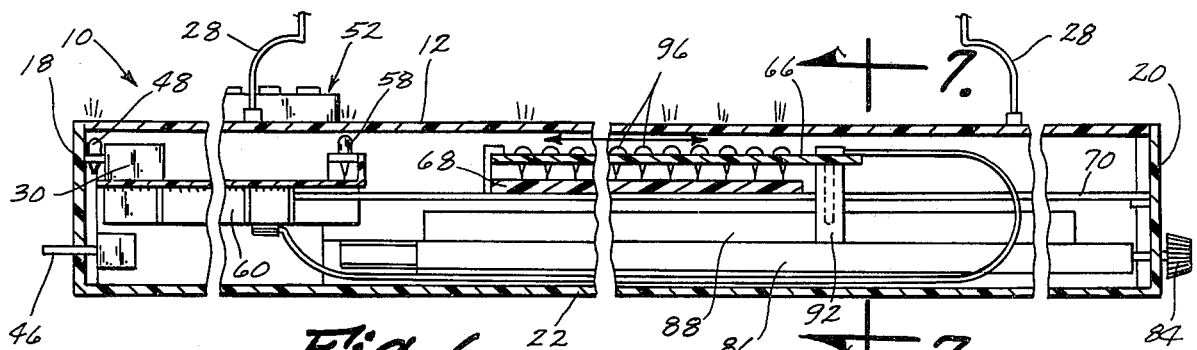
FIG. 6 is a foreshortened side elevational view, partly in section, as seen on line 6—6 in FIG. 5.
Figure 7:
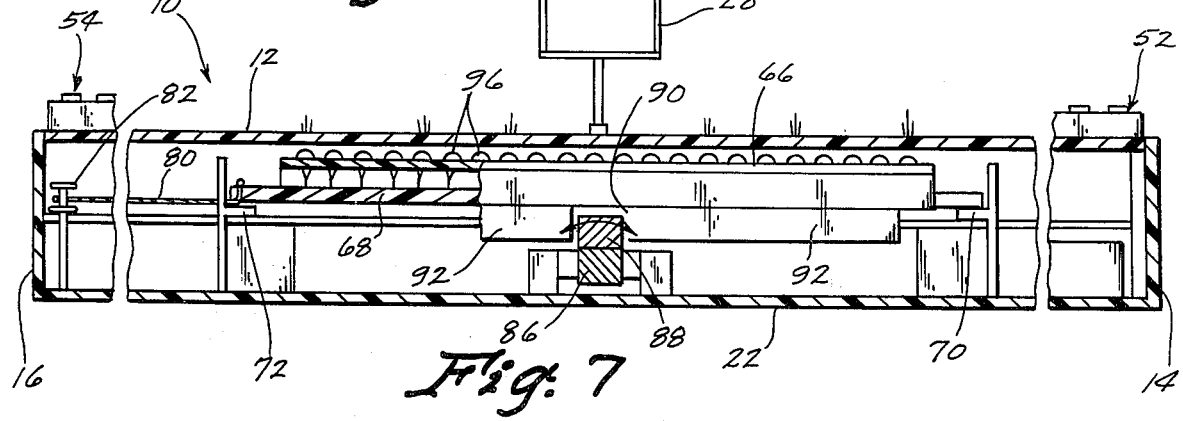
FIG. 7 is a foreshortened longitudinal sectional view of the apparatus as seen on line 7—7 in FIG. 6.

In FIG. 1, the numeral 10 generally designates a support structure comprising a top surface 12, sidewalls 14 and 16, end walls 18 and 20 and bottom surface 22. A simulated playing field 24 is indicated on the top surface 12 and includes appropriate goal lines 26 and miniature goalposts 28. At the far left end of the top surface 12, as seen in FIG. 1, appropriate openings are provided for exposing the digital readout of a timer unit 30 and automatic scoreboard with home and visitor score indicators 32 and 34. Protruding from end wall 18 are knobs 36 and 38 for setting and clearing the home scoreboard, knobs 40 and 42 for setting and clearing the visitor scoreboard, a knob 44 for resetting the timer unit 30, a knob 46 for resetting the quarter indicator lights 48 and a master on-off switch 50 for the apparatus.

Play on the field 24 is controlled by separate offensive and defensive keyboards 52 and 54 and the outcome of each play is indicated by one of the L.E.D.s 56 of a play outcome indicator.

Referring to FIG. 2, offensive keyboard 52 includes twelve keys arranged in three longitudinal rows of four keys each. Three L.E.D.s 58 are arranged adjacent the rows of keyboard 52 for designating the row from which a key is selected. The various designations on the keys of the offensive scoreboard 52 represent the following:

1—series no. 1
2—series no. 2
3—series no. 3
4—series no. 4

K—kick
T—tight end
F—flanker
W—wide receiver
H—hike
C—clear
A—A running back
B—B running back Likewise, the designations of the defensive keys can be interpreted as follows:

Secondary $S_B$—safety blitz
$5_U$—5under, 2 deep
$R_W$—rotation to weak side
N—normal zone

Linebackers

W—Will, weak side blitz
M—Mike, middle L.B. blitz
S—Sam, strong side L. B. blitz
N—normal

Line

K—kick
$B_l$—blast, maximum blitz
$S_l$—stunt, tackle end cross
N—normal

Finally, the designations adjacent the play outcome indicators 56 stand for incomplete pass, gain, loss, interception, fumble and sack or tackle.

A circuit board 60 of a central processing unit occupies the left end of support structure 10 with a memory unit 62 and power source such as battery receptacle 64 disposed along sidewall 14. An L.E.D. matrix board 66 is supported on a platform means 68 which is longitudinally slidably supported on tracks 70 and 72. To longitudinally move the L.E.D. matrix 66 relative to the playing field 24, a knob 74 is provided on end wall 20 for rotating a shaft 76 on which there is oppositely wound first and second cords 78 and 80 which are trained about respective pulleys 82 and secured to opposite ends of platform 68. Accordingly, by rotating knob 74 in opposite directions, the L.E.D. matrix board 66 is advanced in opposite directions longitudinally of playing field 24.

To move the L.E.D. board laterally of the playing field 24, a second knob 84 is centrally positioned on end wall 20 and connected to an elongated square shaft 86 having an upstanding actuator bar 88 thereon adapted to engage the sides of an opening 90 in a depending wall portion 92 attached to the L.E.D. board 66. Accordingly, by rotating knob 84, the L.E.D. board 66 is transversely moved toward one side or the other of platform 68 for aligning a play along the right or left-hand hash marks 94 which are indicated on the playing field 24 in FIG. 1.

Figure 9:
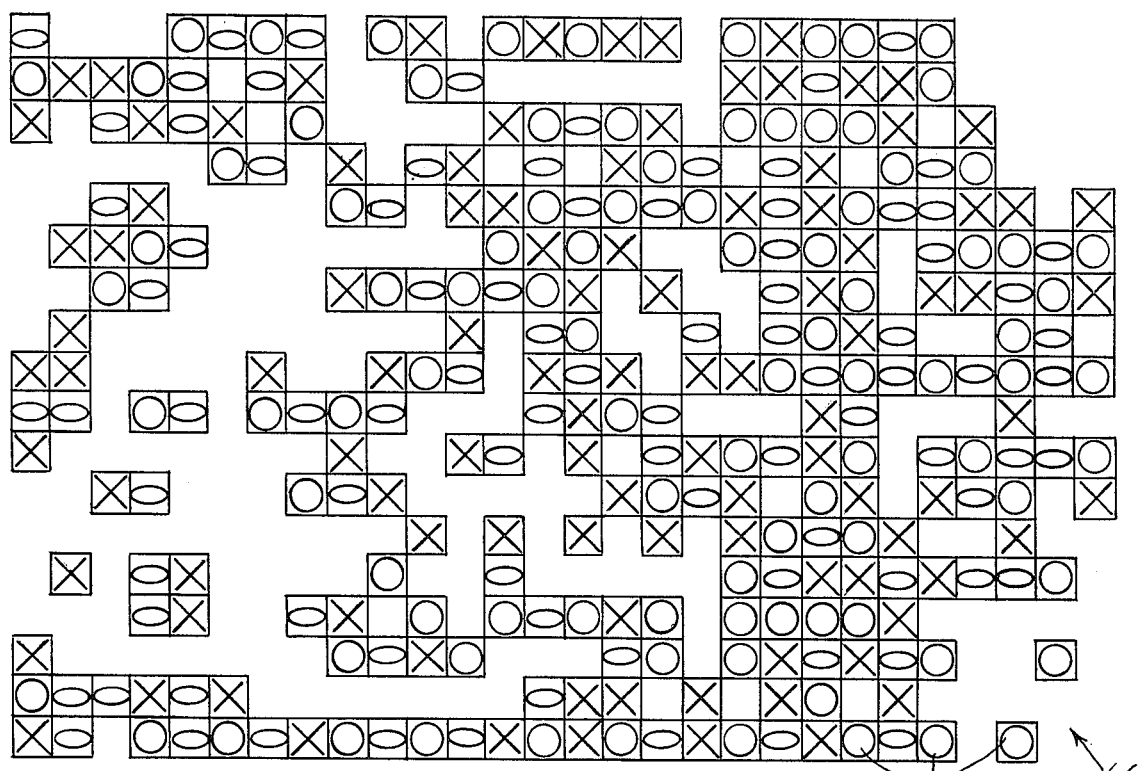
FIG. 9 is a schematic showing of the L.E.D. placements of the player position matrix.

The L.E.D. board 66 is shown in FIGS. 5 and 6 as including a plurality of light-emitting diodes 96 arranged on a matrix indicated schematically in FIG. 9. Three different colors of light-emitting diodes are provided as indicated by the x's, circles and ovals of the matrix positions in FIG. 9. The circles represent offensive players, the x's, defensive players and the ovals, different ball positions. At any given time during the course of a play, eleven offensive player L.E.D.s, eleven defensive player L.E.D.s and one ball L.E.D. are illuminated to designate the player and ball positions. Top surface 12 is preferably translucent, although not transparent, so that the multi-colored L.E.D.s 96 are visible on the playing field 24 without exposing the various wires and structure for moving the L.E.D. matrix board 66 within the support structure 10.

In operation, on-off switch 50 is closed to provide power to the central processing unit 60 from the batteries 64. Knobs 38 and 42 are used to clear the home and visitor's scoreboard and knobs 44 and 48 are used to reset the timer 30 and quarter lights 48 respectively. To initiate play, the offensive player selects one of four play series stored within the memory unit 62 and depresses the corresponding key in the top row of the offensive keyboard 52. Modification of the selected play series is accomplished by the offensive player's selection of tight end, flanker or wide receiver by depressing the corresponding key of the middle row and by selecting between the A and B running backs indicated by the appropriate keys in the bottom row on the offensive keyboard 52. Illumination of the L.E.D.s 58 indicates selection of a key from the adjacent row.

Similarly, the defensive player also has many options in assembling a defense against the offensive play. A separate strategy for the line, line backer and secondary can be selected by depressing one key of each row of the defensive keyboard 54.

Figure 8:
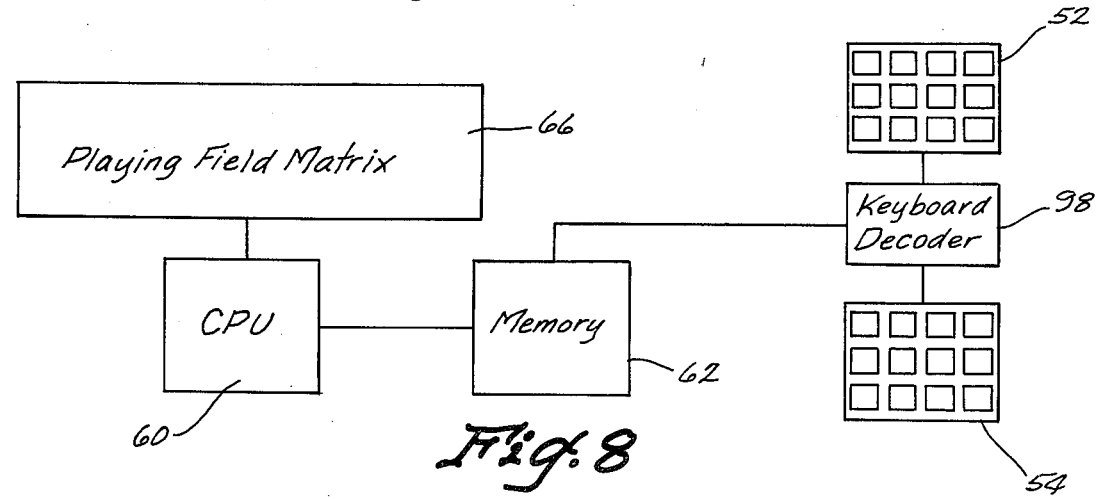
FIG. 8 is a schematic block diagram of the operation of the invention.

Referring to FIG. 8, a keyboard decoder 98 interprets the key selections into computer readable signals. The micro-processor 60 scans the keyboard decoder and then actuates the replaceable portion of the memory unit 62 to store the keyboard selected play information. A permanent portion of the memory unit then directs the micro-processor 60 to the next function which is actuating the L.E.D. matrix board 66 to display the player and ball positions corresponding to the first sequence of the selected play. Play is then initiated by the offensive player depressing the "hike" key whereupon the changing positions of the players and ball are visually and sequentially displayed by the L.E.D. matrix 66 as it activated by the micro-processor 60 through the memory unit 62.

Figure 10:
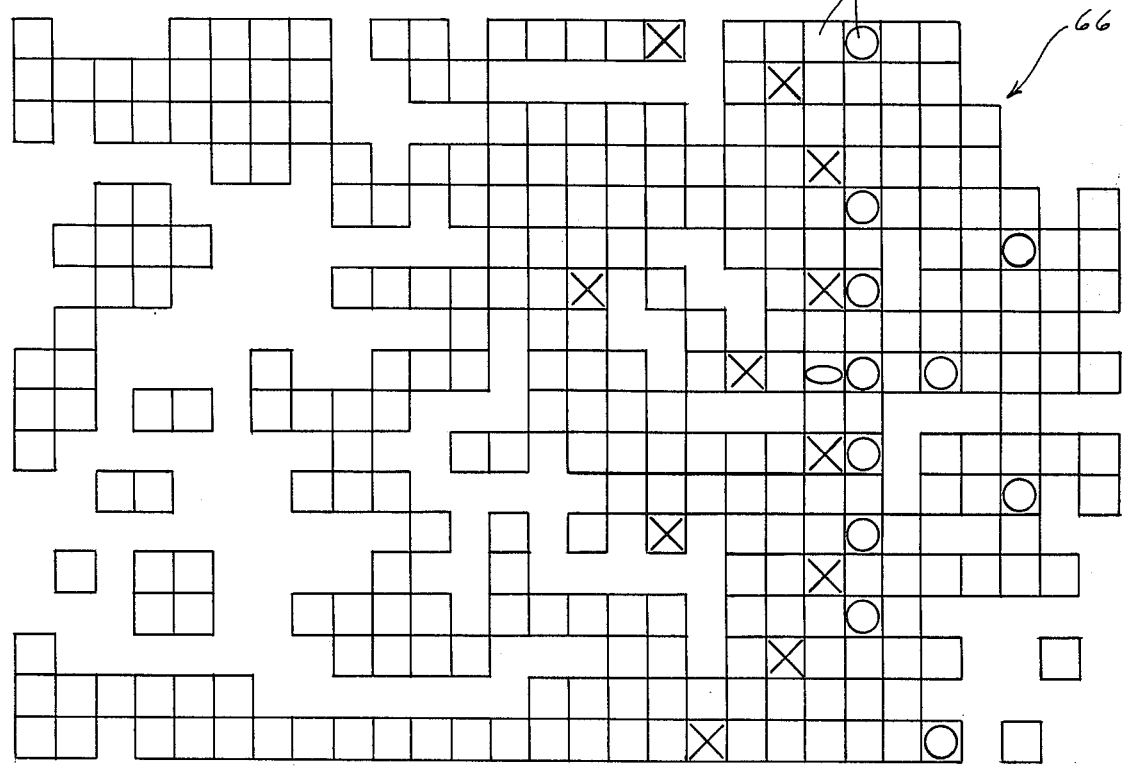
FIG. 10 is a schematic showing of the player positions corresponding to the first sequence of a given play.
Figure 11:
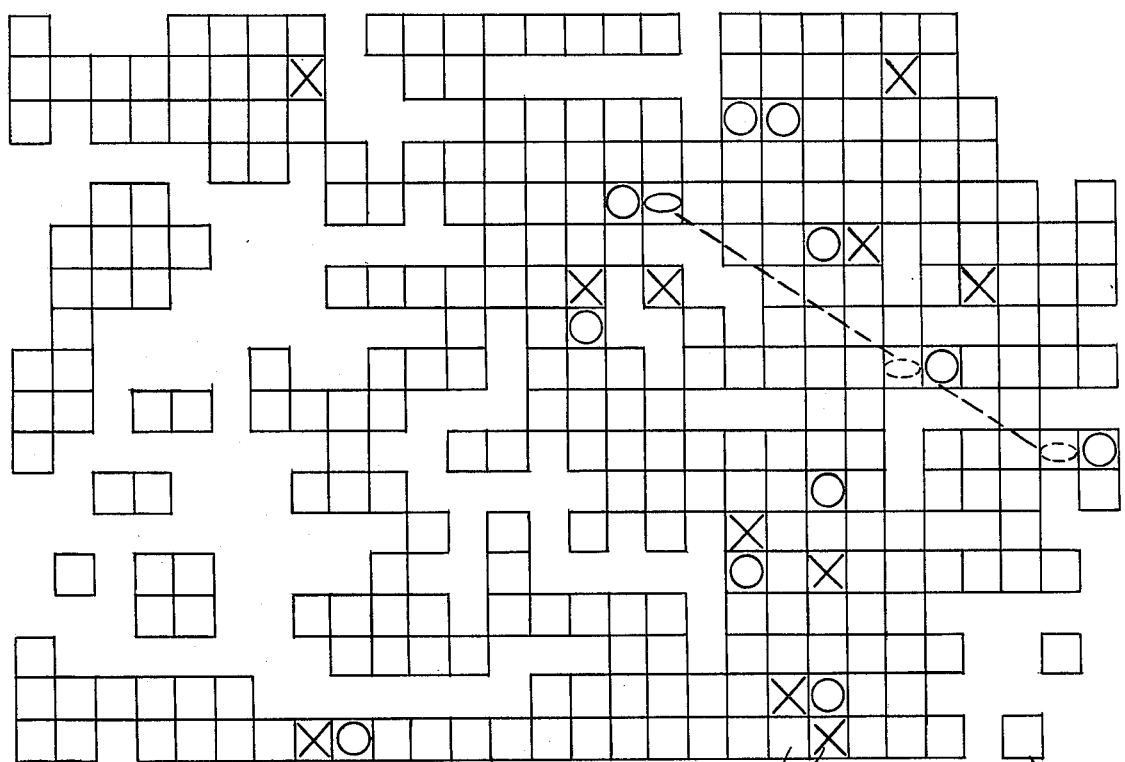
FIG. 11 is a schematic showing of the player positions corresponding to the seventh sequence of the same play.
Figure 12:
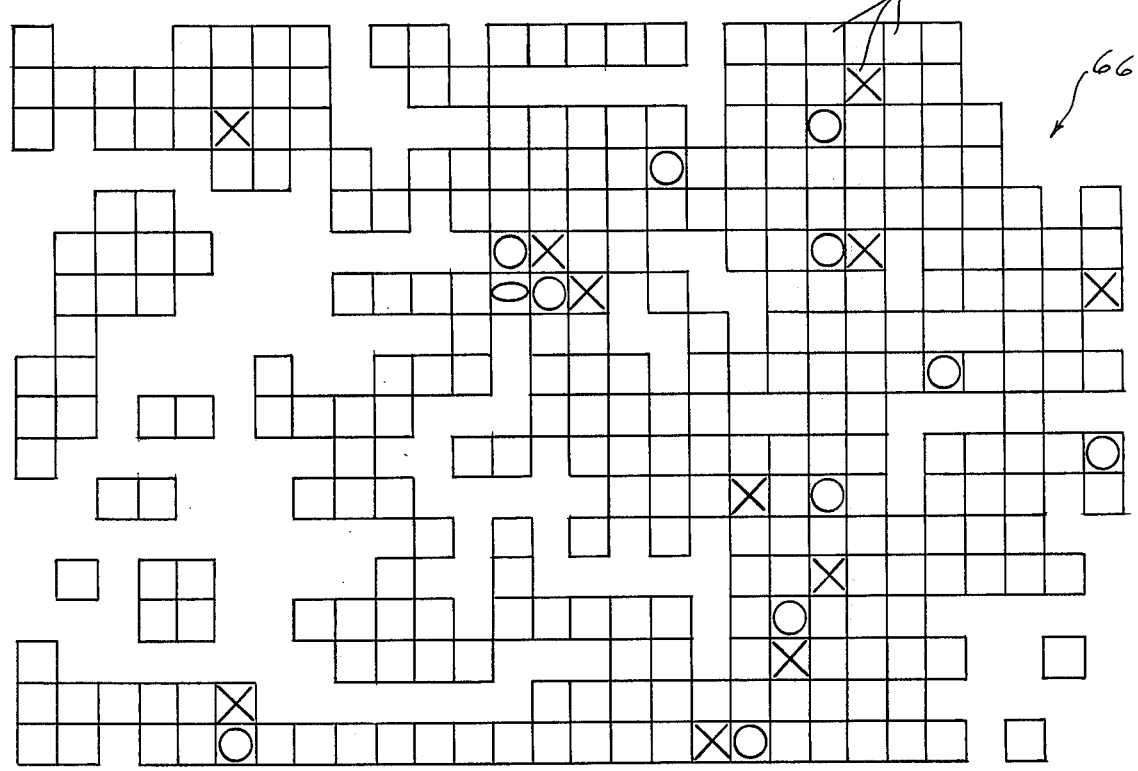
FIG. 12 is a schematic showing of the player positions corresponding to the eighth sequence for the same play.

Each play is thus displayed in a plurality of sequences to simulate the actual changing positions of players and the ball during a given play. Referring to FIG. 10, for example, the positions of the players and ball are designated for a play in which the offensive player has selected series no. 1 with the wide receiver, key W, being selected to run a hook pattern. The defense is set up according to a normal line and secondary with the linebackers programmed for a weak side blitz. Upon depression of the hike key by the offensive player, the L.E.D. indicia of matrix board 66 are sequentially operated to designate the changing positions of the players and ball through ten sequences. The positions of the players and ball in the seventh sequence are indicated in FIG. 11 wherein it is seen that a pass has been thrown and completed as indicated by the dotted and solid line positions of the ball as designated by the oval symbol. FIG. 12 displays the player and ball positions corresponding to the eighth sequence of the same play wherein the play terminates with the ball carrier being tackled. At this point, the play outcome indicator 56 is activated to illuminate the L.E.D. designated "sack".

Depending on the location of the ball at play termination, the L.E.D. matrix board 66 is repositioned on the playing field 24 by knobs 72 and 84 to align the ball on the new line of scrimmage with the right or left-hand hash marks 94 for commencement of the next play.

In further response to the termination of a play, the permanent portion of the memory directs the microprocessor 60 to dump the information in the replaceable memory and to address the keyboard decoder for receiving information corresponding to the next play.

The method steps of the present invention are believed to be apparent from the above description. Briefly, the method of sequentially observing player positions in predetermined game plays includes actuating the keyboard control means thereby selecting one of various play sequences and visibly and sequentially imposing the changing positions of the players and ball on the L.E.D. matrix board through the memory unit.

Accordingly, the present invention affords sufficient options for both the offensive and defensive players that realistic game situations can be visually and sequentially enacted on the matrix board 66 both for challenging game board recreation and for serious teaching, coaching and research of game strategies.

Whereas the preferred embodiment has been disclosed as simulating a football game, it is apparent that the apparatus and method of the invention are equally applicable for portraying game situations of such other sports such as socker, basketball, baseball, etc.

I claim:

1. A device for sequentially observing player positions in predetermined game plays comprising:
    a player position matrix comprising a plurality of indicia means designating a plurality of player positions for each of two teams and a plurality of ball positions;
    a memory means operatively connected to said matrix and comprising a micro-processor, a timer, a fixed memory and a replaceable memory, said fixed memory including a plurality of play sequences of predetermined time some combinations of which result in a score being achieved, an offensive play sequence group which contains at least one distinct offensive play sequence for each of a plurality of offensive team players and further including separate play sequence groups for each of said teams and various ball positions for each play sequence, and wherein said replaceable memory is adapted to temporarily store play sequences, the total playing time and the cumulative score for each team;
    a control means comprising a keyboard including a plurality of keys corresponding to said play sequences and a keyboard decoder, said keyboard and keyboard decoder being operatively associated with said fixed memory means to permit selection of one of said play sequences from each of said play sequence groups and both operatively associated with said replaceable memory to temporarily and simultaneously store said selective play sequences, and wherein said control means is adapted to permit the selection of any of said offensive play sequences;
    and whereby the changing positions of the players of each team and the ball will be visually, simultaneously and sequentially imposed on said matrix through said memory means, and
    an elongated support means, means for supporting said player matrix on said support means and means for moving said matrix longitudinally on said support means and means for moving said player matrix transversely of said support means.

2. The device of claim 1 wherein said fixed memory means includes an offensive play sequence group which contains a plurality of mutually independent and distinct play sequences for each of a plurality of different offensive players, and said control means is further adapted to permit the selection of any of said distinct offensive play sequences.

3. The device of claim 2 wherein said fixed memory means includes four mutually independent and distinct offensive play sequences for each of five different offensive players, said keyboard means further comprises a key for each distinct offensive play sequence and for each of said five offensive players, and said control means is further adapted to permit selection of said distinct offensive play sequence for one of said five offensive players by activation of a key designating said distinct offensive play sequence and a key designating one of said five offensive players.

4. The device of claim 1 wherein said fixed memory includes a defensive play sequence group which includes a plurality of mutually independent and distinct defensive play sequences for each of a plurality of subgroups of defensive team players, said control means is further adapted to permit the selection of one distinct defensive play sequence for each of said defensive subgroups, and said replaceable memory is further adapted to temporarily and simultaneously store said selected distinct defensive play sequence for each of said subgroups.

5. The device of claim 4 wherein said fixed memory means includes a defensive play sequence group which includes a plurality of mutually independent and distinct defensive play sequences for each of three subgroups of defensive team players.

6. The device of claim 5 wherein said defensive play sequence group includes four mutually independent and distinct defensive play sequences for each of said three subgroups of defensive players, said keyboard is further adapted to include a key for each distinct defensive play sequence, and said control means is further adapted to permit selection of one of said distinct defensive play sequences for each of said subgroups by the activation of a key designating said distinct defensive play sequence for said subgroup.

7. The device of claim 6 wherein said fixed memory means includes four distinct and mutually independent offensive play sequences for each of five different offensive players, said keyboard means is further adapted to include a key for each distinct offensive play sequence and for each of said five offensive players, said replaceable memory means is further adapted to temporarily store one of said distinct offensive play sequences and one of said defensive play sequences of each of said three defensive subgroups simultaneously, and said control means is further adapted to permit the selection of said distinct offensive play sequence for one of said five offensive players by activation of a key designating said distinct offensive play sequences and a key designating one of said five offensive players, whereby the changing positions of the ball, the offensive players and the defensive players will be visually, simultaneously and sequentially imposed on said matrix through said fixed and temporary memory means.

8. The device of claim 7 wherein said plurality of indicia means consists of indicia for displaying said plurality of ball and player positions which are possible from selectable combinations of distinct offensive play sequences and distinct defensive play sequences.

9. The device of claim 8 wherein said means for moving said matrix longitudinally comprises two oppositely wound cords connected to a single lever and attached to opposite, transverse ends of said matrix and said means for moving said matrix transversely comprises an upstanding actuator bar adapted to engage said matrix.

10. A method of observing sequentially player positions in predetermined game plays, comprising: programming a fixed memory means to include a plurality of ball positions, and a plurality of mutually independent and distinct play sequences of predetermined time for each of five players on an offensive team and for each of three subgroups of players on a defensive team, some combinations of said play sequences which result in a score being achieved; programming a replaceable memory means to simultaneously and temporarily store elapsed play sequence time, cumulative score for each of said teams, one of said distinct offensive team play sequences, and one of said distinct defensive team play sequences for each of said three defensive subgroups; operatively connecting to said fixed and temporary memory means, a control means to permit selection of one of said distinct offensive team play sequences for one of said five players by activating a key designating said play sequence and a key designating said one of five players, and to permit selection of one of said distinct defensive play sequences for each of said three subgroups by activating a key designating said distinct defensive play sequence for said subgroup; and imposing simultaneously and sequentially the play sequence contents of said temporary memory means on a player position matrix comprising a plurality of indicia means designating a plurality of player positions for each of said teams and a plurality of ball positions, whereby the changing positions of the ball, the offensive players and the defensive players will be visually, simultaneously and sequentially displayed.

* * * * *